US006832080B1

United States Patent
Arslan et al.

(10) Patent No.: US 6,832,080 B1
(45) Date of Patent: Dec. 14, 2004

(54) APPARATUS FOR AND METHOD OF ADAPTING A RADIO RECEIVER USING CONTROL FUNCTIONS

(75) Inventors: Huseyin Arslan, Durham, NC (US); Karl James Molnar, Cary, NC (US); Gregory E. Bottomley, Cary, NC (US); Ali S. Khayrallah, Apex, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 506 days.

(21) Appl. No.: 09/660,050

(22) Filed: Sep. 12, 2000

(51) Int. Cl.[7] .................................................. H04B 1/10
(52) U.S. Cl. ....................... 455/296; 455/277.2; 375/150
(58) Field of Search ................................ 455/296, 501, 455/506, 63.1, 63.3, 67.11, 67.13, 168.1, 226.1, 277.1, 278.1, 277.2; 375/150, 348

(56) References Cited

U.S. PATENT DOCUMENTS

| | | | |
|---|---|---|---|
| 5,375,143 A | | 12/1994 | Kazecki et al. |
| 5,574,750 A | | 11/1996 | Peponides et al. |
| 5,581,580 A | * | 12/1996 | Lindbom et al. ............ 375/340 |
| 5,790,549 A | * | 8/1998 | Dent ............................ 370/479 |
| 5,790,551 A | | 8/1998 | Chan |
| 5,790,606 A | * | 8/1998 | Dent ............................ 375/348 |
| 5,933,768 A | | 8/1999 | Skold et al. |
| 6,006,110 A | * | 12/1999 | Raleigh ........................ 455/561 |
| 6,108,517 A | * | 8/2000 | Arslan et al. .................. 455/21 |
| 6,128,276 A | * | 10/2000 | Agee ............................ 370/208 |
| 6,215,827 B1 | | 4/2001 | Balachandran |
| 6,219,561 B1 | * | 4/2001 | Raleigh ........................ 455/561 |
| 6,327,256 B1 | | 12/2001 | Paivike et al. |
| 6,370,135 B1 | | 4/2002 | Gardner |
| 6,563,861 B1 | * | 5/2003 | Krasny et al. ............... 375/150 |

FOREIGN PATENT DOCUMENTS

WO          WO/00/41317          7/2000

OTHER PUBLICATIONS

Chen et al., Low Complexity Joint MLSE Receiver in the Presence of CCI, IEEE 1998.

Rezaaifar et al., "A Hybrid Multi-User Detection Scheme for CDMA Systems", International Journal of Electronics and Communications, (AEU) (1999; No. 2 pp. 106–113).

* cited by examiner

Primary Examiner—Tony T. Nguyen
(74) Attorney, Agent, or Firm—Moore & Van Allen PLLC; Gregory A. Stephens

(57) ABSTRACT

An adaptive radio receiver utilizes control functions derived from received signals in an interference-limited environment to decide whether to implement conventional single-user demodulation or joint demodulation. The decision to implement joint or conventional demodulation is based upon the values of estimates derived for Doppler spread, carrier-to-interference plus noise, dispersiveness and the likelihood of the presence of a dominant interferer.

34 Claims, 6 Drawing Sheets

APPARATUS FOR AND METHOD OF ADAPTING A RADIO RECEIVER USING CONTROL FUNCTIONS

BACKGROUND OF THE INVENTION

The present invention relates to using control functions to adapt a radio receiver to selectively perform either conventional or joint demodulation.

The cellular telephone industry has made phenomenal strides in commercial operations in the United States as well as the rest of the world. Growth in major metropolitan areas has far exceeded expectations. Solutions are required to meet these increasing capacity needs and to maintain high quality service.

As additional users are introduced to wireless cellular systems, the system characteristics change from a noise-limited to an interference-limited environment. Interference problems can arise when signals transmitted between locations suffer from echo distortion or multipath time dispersion caused, for example, by signal reflections from large buildings or nearby mountain ranges. Multipath dispersion occurs when a signal proceeds to the receiver along not one, but many paths, so that at the receiver many echoes having different and randomly varying delays and amplitudes occur. For example, when multi-path time dispersion is present in a TDMA system, the receiver receives a composite signal comprising multiple versions of the transmitted symbol that have propagated along different paths having different relative time delays. At the receiver, such multiple versions of the transmitted signal can cause self-interference.

In addition to being performance limited by self-interference, receiver performance also may be limited by co-channel signal interference. Work has been done to address the problem of co-channel signal interference by means of joint demodulation. Note, for example, the discussions of and approaches to joint demodulation that are found in U.S. Pat. Nos. 5,506,861, 5,790,549 and 5,790,606, assigned to the assignee of the present invention and the teachings of which are incorporated herein by reference.

SUMMARY OF THE INVENTION

The present invention relates to a radio receiver comprising a Doppler spread estimator for generating an estimated Doppler spread value of the carrier; a first estimator generates an estimated carrier-to-dominant interferer plus noise ratio value, and a second estimator generates an estimated dominant interferer plus noise-to-noise ratio value. In addition, a control unit selectively controls the radio receiver, in accordance with the estimated values, to selectively implement either single-user demodulation of the carrier or joint demodulation of the carrier and dominant interferer.

The invention also contemplates a method of operating a radio receiver, which receives a signal that includes a desired carrier, a co-channel dominant interferer and noise. The method comprises generating an estimated Doppler spread value of the carrier; developing an estimated carrier-to-dominant interferer plus noise ratio value, and providing an estimated dominant interferer plus noise-to-noise ratio value. In addition, the method controls the radio receiver, in accordance with the estimated values, to selectively implement either single-user demodulation of the carrier or joint demodulation of the carrier and dominant interferer.

The foregoing and other advantages and features of the invention will become apparent upon a consideration of the following description, when taken in conjunction with the accompanying drawings.

DETAILED DESCRIPTION OF THE INVENTION

Figure 1:
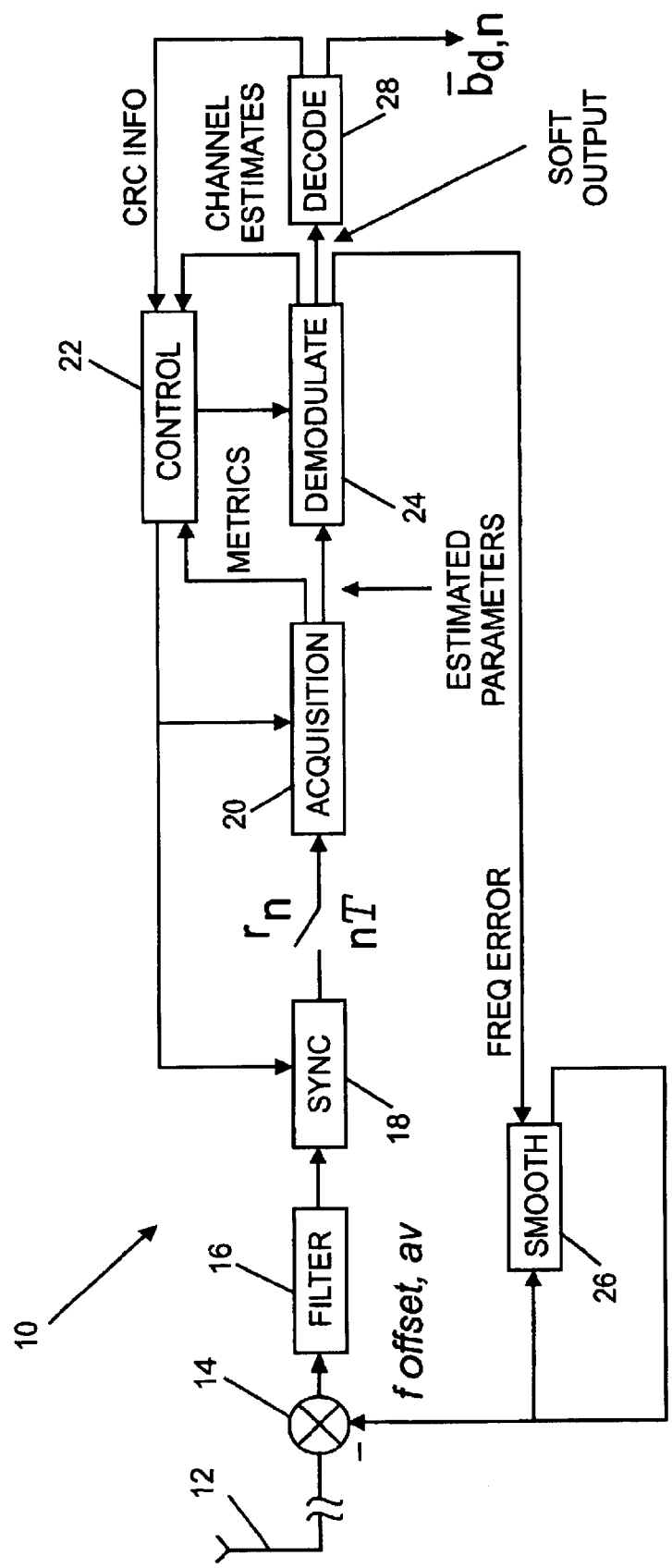
FIG. 1 is a block diagram of a control portion of a radio receiver, for selectively controlling the receiver to use conventional or joint demodulation in accordance with the values of control functions derived from received signals.

Co-channel interference is a major impairment to performance of radio receivers, such as mobile communications system radio receivers. It has been found that joint demodulation can improve the performance of a receiver in interference-limited environments, but at the expense of computational complexity. The complexity increases with the number of users and the number of desired signal and interferer signal channel taps used in the demodulator or equalizer. The present invention contemplates selective use of conventional or joint demodulation in an adaptive radio receiver in interference-limited environments. To limit computational complexity, it is assumed that only one single dominant interferer is present and degrading receiver performance. The presence of a dominant interferer at a receiver is very likely when the receiver experiences bad signal quality, i.e., a low carrier-to-interference ratio C/I. Thus, the invention contemplates identifying, under the condition of bad signal quality at a receiver and for the purpose of adapting the receiver to employ joint demodulation, whether a dominant interferer exists.

Although joint demodulation improves receiver performance when a dominant interferer exists, there can be situations where there is no or very low interference, in which using a joint demodulator might degrade receiver performance, while increasing computational complexity unnecessarily. In addition, even if channel quality is low, where conventional demodulation or equalization does not perform well, joint demodulation might not perform well either, such as in the situation where a low C/I is being caused by the presence of more than one interferer at the receiver. Therefore, it is contemplated that the receiver use joint demodulation only when there is a single strong co-channel interference present in the received signal, and that the receiver otherwise use conventional demodulation.

The invention takes into account that joint demodulation is sensitive to dispersion in the desired channel response, but is not highly sensitive to dispersion in interferer channel response. When channels are dispersive, channel acquisition and channel estimation algorithms do not perform as well as when the channel is flat. If it is known that a channel is flat, receiver performance can be improved by changing the channel acquisition and estimation parameters accordingly, while reducing the required computational complexity considerably. The invention therefore contemplates use of a control function that identifies the dispersiveness of the channel as a factor for consideration in deciding of whether to employ joint demodulation to improve receiver performance.

For low-speed mobile receivers, such as in mobile terminals, joint demodulation improves the receiver performance considerably, in the presence of a dominant interferer, compared to conventional demodulation. For moderate-speed mobile receivers, the gains in receiver performance afforded by joint demodulation may be limited. For high-speed mobile receivers, joint demodulation may not perform as well as conventional demodulation for some C/I levels. As a result, the invention further contemplates identifying the Doppler spread value of the desired signal and using joint demodulation selectively, depending on the Doppler spread information.

The invention makes use of several control functions in an adaptive radio receiver that has the ability of demodulating co-channel signals jointly. With such control functions and the values of the control functions, the adaptive receiver selects the right demodulator or parameters for the signal conditions then existing. As a result, performance of the receiver is improved while computational complexity is minimized.

The contemplated control functions (speed estimation, noise estimation, dominant interference estimation, dispersive or non-dispersive channel identification, etc.) are used by the receiver in the process of making the decisions whether to use joint demodulation or conventional demodulation. The decisions are made on a slot-by-slot basis. The control functions attempt to turn on joint demodulation by the receiver in favorable conditions, falling back to conventional demodulation or equalization in fast fading or dispersive signal conditions. Because conventional demodulation is less complex, multipass demodulation or other enhancements can be used for improving receiver performance.

FIG. 1 shows a block diagram of part of an adaptive radio receiver system in which joint demodulation is integrated with conventional single-user demodulation in the receiver, such that joint demodulation is selectively available to the receiver for processing received signals under favorable conditions as determined by the values of control functions. In the described implementation of the invention, joint demodulation is not preferable to conventional equalization under receiver signal environments where: (1) no or very limited signal interference is present; (2) high mobile speeds exist; (3) the desired signal is heavily dispersive, and/or (4) multiple dominant interferers exist. Clearly, when no interference is present, it is better to turn joint demodulation off and use conventional demodulation, rather than estimate quantities for an interfering user that is not there. Also, the conventional equalizer is tuned for higher mobile speeds and a dispersive signal, with the consequence that channel estimation becomes the limiting factor when more quantities have to be estimated due to addition of an interfering user, which is especially true for some fixed level of computational complexity. For such reasons, the implementation of the described embodiment of the invention is such as to detect only one dominant interferer as a criteria employing joint demodulation.

Figure 6:
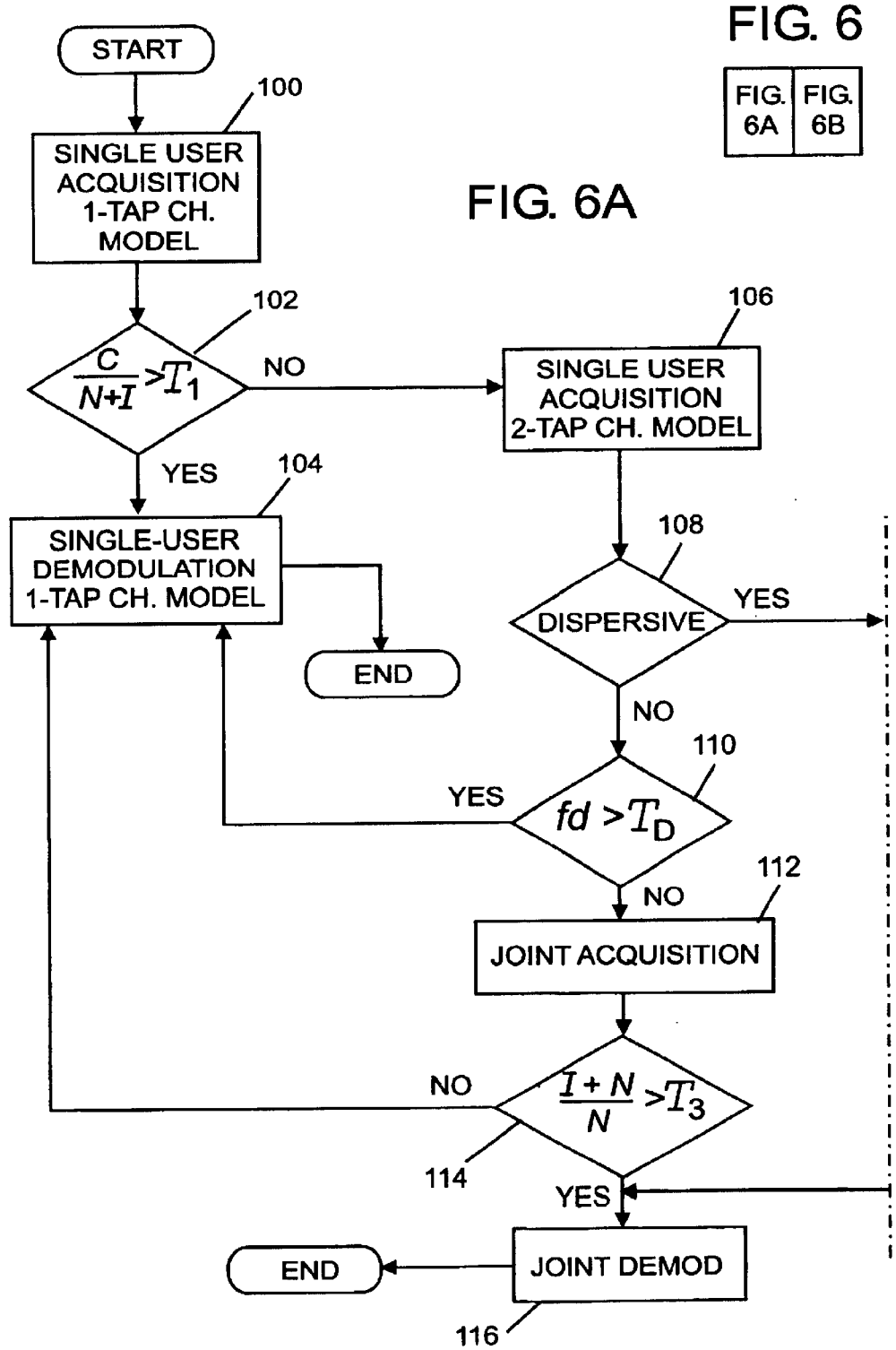
FIG. 6 is a flow chart showing a second contemplated mode of operation of the radio receiver.
Figure 6B:
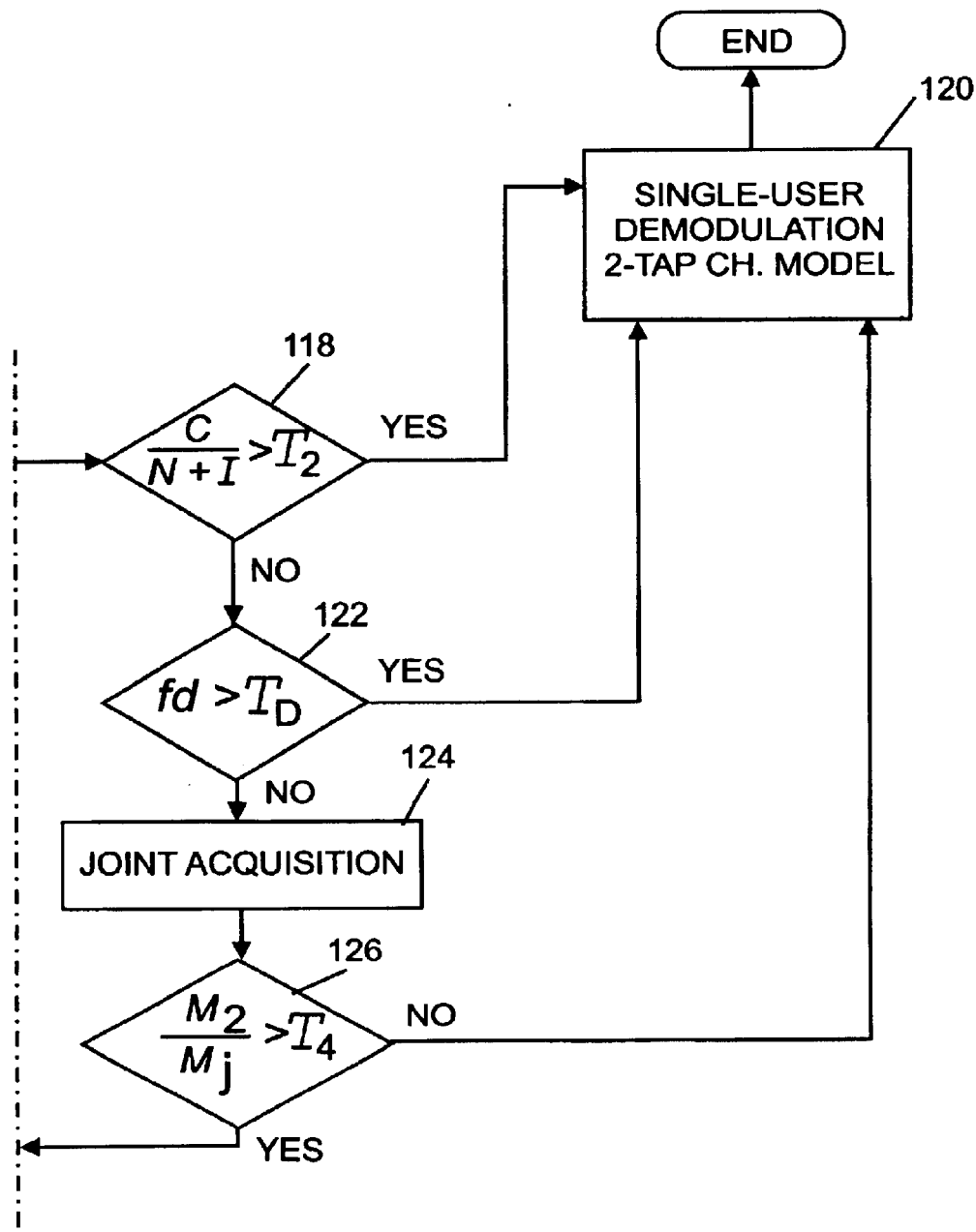

The present invention is described herein in the context of a mobile terminal 200 of a mobile communication system 202, see FIG. 6. The receiver system 10 may also be implemented in a base station receiver 204 of a base station 206 of the mobile communication system 202, as will be apparent. As used herein, the term "mobile terminal" may include a mobile communications radiotelephone with or without a multi-line display; a Personal Communications System (PCS) terminal that may combine a mobile communications radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The part of the receiver system 10 shown in FIG. 1 includes a receiver front end comprising an antenna 12, a multiplier block 14 and a filter block 16 where the received signal is downconverted, frequency corrected according to an estimated frequency offset of the desired signal, and filtered. Although a single antenna 12 is illustrated, the receiver system 10 could use more than one antenna. A sync block 18 inputs the baseband signal from the filter 16 and selects one of the sampling phases depending on the sync point chosen from correlating to the desired signals sync sequence. Conventional demodulation uses a two-tap sync algorithm which is a sync algorithm designed for dispersive channels. When joint demodulation is considered, a one-tap sync point (designed for flat fading channels) is also computed since only one desired signal tap is assumed for joint demodulation. After acquisition, the synchronization point for the chosen demodulation method is used for further processing. The sync block outputs the received signal samples $(\tau_n)$ at sampling time (nT), where n is the sample number and T is the sample period.

An acquisition block 20 performs the function of training the channel for the desired signal, starting with generating initial channel estimates computed *from correlations at the selected sync point Additionally, for joint demodulation, the interferer channel and delay timing is acquired in the acquisition block 20. Different delay timings are hypothesized, and training is performed jointly for both the desired signal and the interferer signal. This may be done as described in an application entitled "Method and Apparatus for Co-channel Interference", Ser. No. 09/143,821, filed Aug. 31, 1998. A control block 22 uses metric values for both conventional and joint demodulation to determine which demodulation approach should be used for data detection.

A demodulate block 24 uses either conventional or joint detection to demodulate the unknown data. It outputs hard bit values for uncoded transmitted bits and soft bit values for coded bit data. The demodulation process also outputs channel estimates that are used in the control function performed by the control block 22 to estimate Doppler speed, and frequency estimates that are used by a smooth block 26 to correct the signal clock due to frequency error in the received signal. In addition, the output from the demodulate block 24, which can be generated by either the conventional or joint demodulation process, is input to a decode block 28. The output of the decode block 28 provides cyclic redundancy code (CRC) information to the control block 22, which is used as a measure of signal frame validity. The CRC information also is used in the long-term Doppler estimation process, and indirectly affects which approach is chosen for demodulation.

Frequency error of the received signal with respect to the desired signal is estimated, filtered and used to further correct the received signal in subsequent data slots.

The control block 22 performs the control function and determines whether conditions are favorable for using joint demodulation, as compared to conventional demodulation. If conditions are not favorable for joint demodulation, the control block selects conventional equalization for use. Favorable conditions can occur, for example, when the mobile is in a slow, flat fading environment when a single dominant interferer is present The control function must therefore differentiate between slow and fast Doppler speeds, flat and dispersive fading, and the presence and absence of a single dominant interferer.

Figure 2:
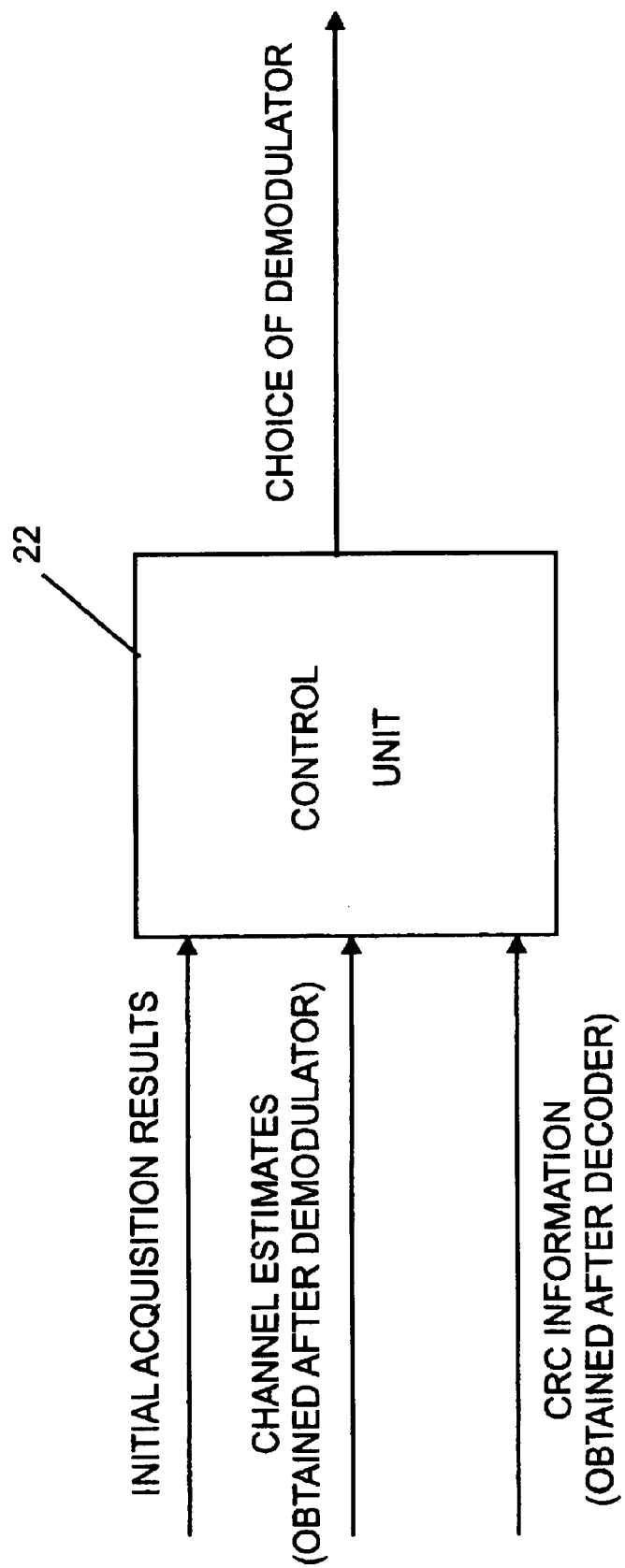
FIG. 2 is a block diagram of the control unit of FIG. 1.

FIG. 2 shows the control block 22 of FIG. 1, as a control unit which uses information obtained from the acquisition, demodulation and decoding algorithms to decide whether to perform single-user demodulation or joint demodulation. The invention contemplates that the decision be made on the basis of three channel condition indicators: (1) the Doppler spread for the desired signal ($f_{D,av}$); (2) the carrier-to-interference plus noise ratio C/(I+N) or signal-to-interference plus noise ratio SINR, and (3) the dominant interferer plus noise-to-noise ratio (I+N)/N, where here and throughout the disclosure C is a desired signal, I is a co-channel dominant interferer, and N is all other noise, i.e., the sum of all other co-channel interferers plus thermal noise. These indicators are estimated by using the accumulated metrics obtained from single-user and joint acquisition, the instantaneous channel amplitude estimates obtained from demodulation, and the CRC information obtained from decoding.

One of the major control functions used in determining whether to adapt the receiver 10 to employ joint demodulation is the Doppler spread estimator. As mentioned, joint demodulation does not perform well for high Doppler spread values, receiver gains are limited for intermediate Doppler spread values, and gains in receiver performance are significant for low Doppler spread values. Consequently, the control block 22 uses a Doppler spread estimate in making a decision whether to adapt the receiver to use the joint detector (low Doppler spread values) or to use the conventional detector (high Doppler spread values).

One contemplated, but not exclusive, technique for determining Doppler spread estimate values is as follows:

$$\hat{D}(n)=|\hat{c}(n)|-|\hat{c}(n-r)|, \tag{1}$$

where D(n) represents the absolute differentials of the channel tap estimate, and ĉ(n) is the channel estimate at time n. By using absolute differentials, the effect of frequency error is decoupled from Doppler spread estimation. If r=1, since the differentials of the channel estimates are very noisy, low pass filtering (or averaging) of D(n) is required.

$$\tilde{D}_k = \frac{1}{N}\sum_{n=1}^{N} \hat{D}(n).$$

The bandwidth of the low pass filters, or the averaging window size N, is also a function of the Doppler spread estimate. Additionally, the adaptation parameters of the channel estimator depend on the Doppler spread estimation. Using erroneous adaptation parameters directly affects the performance of the Doppler estimator.

A single receiver antenna and flat fading channel conditions are assumed for Doppler spread estimation. Therefore, the differentials and Doppler estimates are obtained from a single channel tap. However, the same approach can be applied to a dispersive channel by either considering the strongest channel tap estimates, or combining the results from multiple taps. Similarly, the same approach can be applied for multiple antennas by combining the results from multiple antennas.

Figure 3:
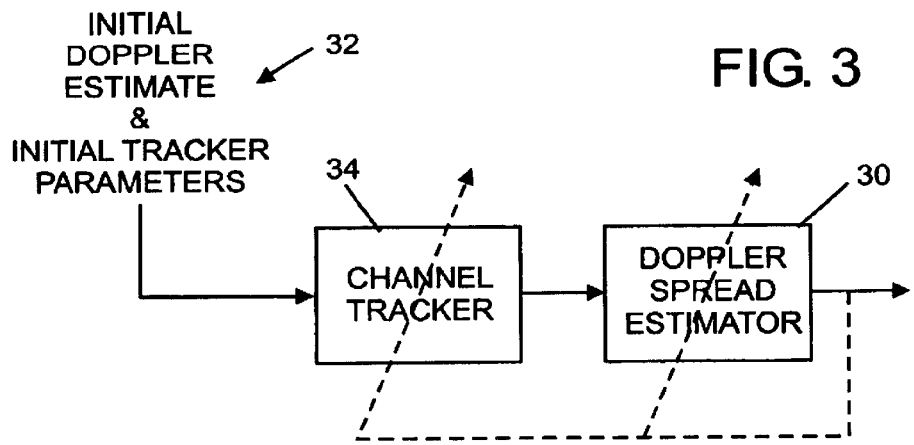
FIG. 3 is a block diagram of a Doppler spread estimator of a type that may be used by the receiver.

FIG. 3 is a block diagram of the Doppler spread estimator 30 of a type as may be embodied in the adaptive receiver 10. The receiver 10 starts with some initial Doppler value and channel tracker parameters 32. Using the channel estimate over the current slot, the Doppler value is updated, and the updated value is then used to adapt the parameters of the Doppler estimator 30 and the Adchannel tracker 34 for the subsequent slots.

To calculate the Doppler spread estimate, begin with the initial Doppler estimate $$\hat{f}_D = \text{Doppler\_init}. \tag{3}$$

The initial channel tracker parameters and Doppler filter parameters are calculated from the initial Doppler estimate 32. For an AR2 type channel tracker 34, there are three parameters in the algorithm: $w_d$ is the Doppler spread that is calculated using the Doppler estimate as $$w_d = \frac{2\pi}{R_s}\hat{f}_d,$$

where $R_s$ is the symbol rate; λ is a form of adaptation gain which can be derived as $$\lambda = 3.5714\cdot 10^{-6} * \hat{f}_D + 1\cdot 10^{-6};$$

and $r_d$, which determines the height of the spectral peak at $w_d$, is kept constant with a value of $r_d$=0.998, in an exemplary embodiment.

If the cyclic redundancy code CRC does not indicate to the contrary, the instantaneous Doppler value over the whole slot is calculated. The slot is divided into sub-blocks of length N. Depending on the block length, each slot will have K sub-blocks. Both N and K are variables that depend on the previously calculated Doppler spread value. The slot consists of 162 channel estimates, ĉ(1) ... ĉ(162). The differentials are calculated from the channel estimates as D̂(n)= |ĉ(n)|−|ĉ(n−1)|,n=1 ... 161. Over each sub-block, the differentials are averaged as $$\tilde{D}_k = \frac{R_s}{N}\sum_{n=1}^{N} \hat{D}(n)$$

The squared magnitude of the averaged differentials is normalized with the variance of the channel estimate as $$\Omega_k = \frac{|\tilde{D}_k|^2}{\tilde{C}_k},$$

Where $$\tilde{C}_k = \frac{1}{N}\sum_{n=1}^{N}|\hat{c}(n)|^2.$$

Then, all the sub-blocks over the slot are averaged to calculate the instantaneous Doppler as $$\hat{f}_{D,inst} = \frac{1}{2\pi}\sqrt{\frac{2}{K}\sum_{k=1}^{K}\Omega_k}.$$

The instantaneous Doppler spread estimates over several slots are averaged using $$\hat{f}_d(s) = \hat{f}_d(s-1)\cdot\beta + \hat{f}_{d,inst}\cdot(1-\beta), \quad (5)$$

where β is chosen as 0.99, in the exemplary embodiment Since Doppler spread Varies slowly over several slots, this is a reasonable value for β. However, it is possible to have different β values while the algorithm converges to the actual Doppler value from the initial Doppler estimate.

It is preferable that the instantaneous Doppler spread estimates be calculated only if the CRC checks. If the CRC does not check, the averaged Doppler spread value is not updated using the instantaneous value of the current slot, so that the instantaneous Doppler values are not used if they are not reliable. The foregoing approach to estimating Doppler spread values improves the estimation for low signal-to-noise ratios and low Doppler spread values.

If the Doppler spread estimate is higher than a threshold value $Th_D$, a conventional demodulator is favored. If the Doppler estimate is less than the threshold value $Th_D$, a joint demodulator is favored.

Since mobile communications systems are interference limited, channel quality measurements reflect the interference level in the received signal. For the case of continuous transmission, one contemplated, but not exclusive, technique for obtaining channel quality information C/(I+N) or SINR is by using the synch word of the desired signal during the initial acquisition process. In slow fading channels, the C/(I+N) estimate does not change significantly over the slot, so the synch word can be used.

The channel quality information is obtained using the synch word of the desired signal during the initial acquisition process. The received signal is modeled as $$r(n) = C_d S_d + C_i S_i + \omega(n) \quad (6)$$

where $C_d$ and $S_d$ represent the channel and symbol sequence of the desired signal, $C_i$ and $S_i$ represent the channel and symbol sequence of the strongest interferer, and ω(n) represents the residual interference (weaker interferers) plus the thermal noise.

Using the channel estimate of the desired signal $\hat{C}_d$, the desired signal's synch word $S_d$ and the received signal r over the synch word, the noise (thermal noise plus total interference) is calculated as $$IpN = K\frac{1}{K}\sum_{k=1}^{K}|r(k) - \hat{r}_d(k)|^2 \quad (7)$$

where K is the length of the synch word, and $\hat{r}_d = \hat{C}_d S_d$ is the estimate of the desired signal over the synch word. The length of the synch word determines the accuracy of the noise estimate.

The residual noise indicates the level of interference (assuming interference limited scenarios, thermal noise is negligible) in the received signal. Once the noise estimate is obtained, using the knowledge of the channel estimate, the carrier-to-interference plus noise ratio C/(I+N), or signal-to-interference plus noise ratio SINR, is calculated as $$\frac{C}{I+N} = \frac{\sum_{l=1}^{L}|\hat{c}(l)|^2}{IpN} \quad (8)$$

where L is the length of the desired channel response. In general, L is the length assumed by the conventional demodulator. Using this information, a decision can be made whether to use conventional demodulation or consider using joint demodulation.

Essentially, the residual error term, which is obtained from the best path metric values using a conventional single user demodulator, provides an estimate of noise plus interference in the received signal. In addition, the channel estimate of the desired signal, which is obtained over the synch word, provides the desired signal power estimate. From these two estimates, the carrier-to-interference plus noise ratio SINR can be calculated. If the estimated SINR level is higher than a preselected threshold level $TH_{SINR}$, the conventional demodulator is used, as it performs well for these values. Otherwise, a flag is raised to consider using joint demodulation. If the joint demodulator flag is raised, a check is made for the existence of a dominant interferer.

If it is determined that the SINR estimate level is lower than the threshold level $Th_{SINR}$, a flag is raised that there might be a strong interference in the received signal. This does not necessarily mean that a dominant interferer is present. An SINR estimate lower than $Th_{SINR}$ might be caused by something other than a dominant interferer, such as by a combination of many weak interferers or because the desired signal is in deep fade. Whatever the reason is, the adaptive receiver runs the joint acquisition over the synch word of the desired signal, on the assumption that a strong interferer is present. The residual noise plus interference is then calculated using the information developed about the desired signal channel estimates, the interfering signal channel estimates, the desired synch word, the interferer symbol estimates over the synch word, and the received signal. If there were a strong interference in the received signal, it is assumed that joint acquisition would take that into account and the residual noise term would be small. Therefore, the noise plus total interference term (I+N), $I_pN$, that was obtained by conventional acquisition, is compared to the noise plus residual interference term ($I_{residual}$+N), $RI_pN$, that was obtained by joint acquisition. If the ratio of $I_pN$ to $RI_pN$ is greater than a preselected threshold value $Th_{dom-int}$, i.e., if $$10*\log 10\left(\frac{I_pN}{RI_pN}\right) > Th_{dom-int'} \quad (8)$$

it is assumed that there is a dominant interferer, and joint demodulation is used for the rest of the slot using initial acquisition parameters obtained by joint acquisition. Otherwise, conventional demodulation is performed using the initial parameters obtained by conventional acquisition.

To determine whether a channel is dispersive or non-dispersive, a parallel approach may be used where models with a different number of taps are assumed for the synchronization and initial acquisition over the synch word. See, for example Bottomley et al. U.S. patent application Ser. No. 08/897,309, filed Jul. 21, 1997. Then, based upon the performance of both models over the synch word, a decision is made as to which model to use during demodulation.

Figure 4:
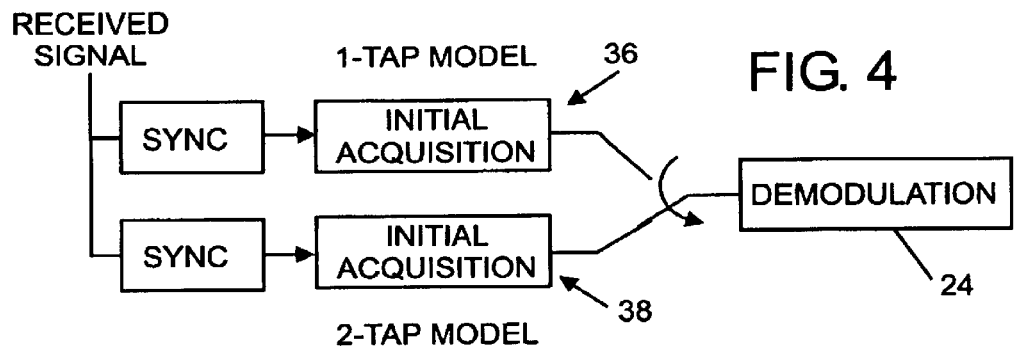
FIG. 4 is a block diagram of the demodulate unit according to the invention.
Figure 7:
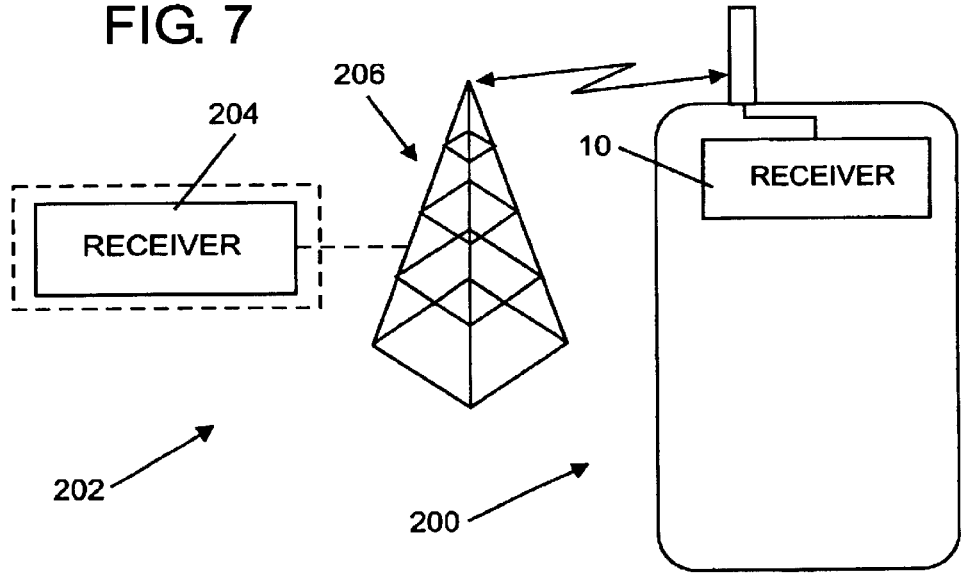
FIG. 7 is a generalized illustration of a mobile communications system including a base station and a mobile terminal in accordance with the invention.

Referring to FIG. 4, the decision of which model to use during demodulation is made based upon the residual error terms, which are obtained from the best path metric values, as used. If $\hat{e}_1$ and $\hat{e}_2$ represent the error terms that are obtained by using, for example a one-tap model for joint demodulation 36 and a two-tap model for a conventional equalizer 38, respectively, then the error terms are calculated as $$e_1 = \sum_k |r(k) - \hat{r}_1(k)|^2 \text{ and} \quad (9)$$

$$e_2 = \sum_k |r(k) - \hat{r}_2(k)|^2 \quad (10)$$

where r(k) is the received signal, and $\hat{r}_1(k)$ and $\hat{r}_2(k)$ are the best fits to the received signal using one and two-tap channel models. Based upon the Bayesian Information Criteria (BIC), the appropriate model is selected by minimizing the quantity $$Q_K = 14 \ln(e_K) + K \ln(14) \quad (11)$$

where K=1 for a one-tap channel model and K=2 for a two-tap channel model. If $Q_1 < Q_2$ a one-tap model is used. Otherwise, if $Q_1 > Q_2$, a two-tap model is used. In other words, if $$10 * \log\left(\frac{e_2}{e_1}\right) > .8,$$

in the exemplary embodiment, a two-tap model is used. Otherwise, if $$10 * \log\left(\frac{e_2}{e_1}\right) < .8,$$

in the exemplary embodiment, a one-tap model is used.

If the channel is determined to be non-dispersive, which demodulator to use depends on whether the SINR or C/(I+N) is good enough, i.e., is above its threshold, to use conventional demodulation. If it is not good enough, then a determination is made whether the speed is low enough and whether a strong dominant interferer is present. If a strong dominant interferer is present and the speed is low, then joint demodulation is used. Otherwise, conventional demodulation is used. If the channel is dispersive, joint demodulation does not perform well. However, it is not known whether the dispersion or the dominant interferer is stronger. If the dominant interferer is stronger, dispersion is ignored and joint demodulation is performed using a one-tap desired channel model. On the other hand, if the dispersion is stronger, then interference is ignored and a conventional single user two-tap equalizer or demodulator is used. The decision is made based on speed and based on comparing the metric values obtained with a two-tap model acquisition over the synch word and-joint acquisition using one-tap desired and multiple tap interferer. It presently is contemplated that if the dominant interferer is on the order of about 3–6 dB greater than the noise level, joint demodulation is used, while if the dominant interferer is on the order of about 3–6 dB less than the noise level, conventional demodulation is used.

In general, the three control functions (Doppler spread, dominant interference, dispersiveness) can be used individually or in various combinations to select conventional or joint demodulation.

Figure 5:
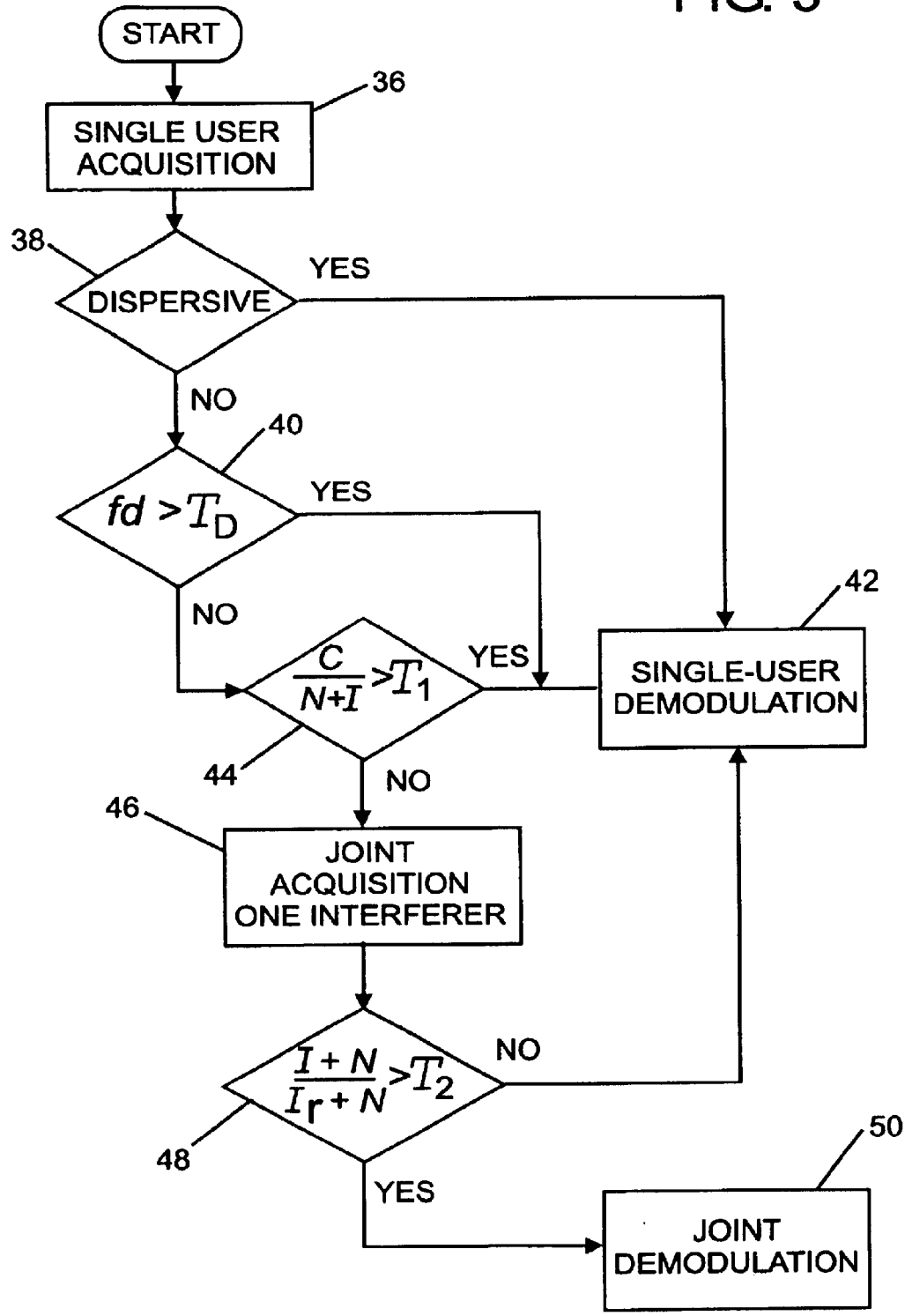
FIG. 5 is a flow chart showing a first contemplated mode of operation of the radio receiver.

FIG. 5 shows a contemplated scenario for use of the control functions in arriving at a decision whether to use a single user demodulator or a joint demodulator. First, single user initial acquisition is performed using conventional acquisition at a block 36. Both 1-tap and 2-tap acquisition is performed. The channel is determined to be dispersive or not at a block 38. If dispersive, single-user demodulation is performed. If not, the Doppler spread estimate for the desired signal is then compared to the threshold $T_D$ at a decision block 40. If the Doppler spread estimate exceeds the threshold $T_D$, then single-user demodulation is performed at a block 42 using the channel parameters estimated by means of single-user acquisition. On the other hand, if the Doppler spread estimate does not exceed the threshold $T_D$, the carrier-to-interference plus noise ratio SINR is estimated and compared to the threshold $T_1$ at a decision block 44. If SINR>$T_1$, then single-user demodulation is performed at the block 42. Otherwise, joint acquisition is performed for the desired signal and an interferer at a block 46. Next, at a decision block 48, the noise plus total interference term (I+N), which is represented by $M_{min}$ in FIG. 5 and that was obtained by conventional acquisition, is compared with the noise plus residual interference term ($I_{residual}$+N), which is represented by $M_{joint}$ and that was obtained by joint acquisition. If $$\frac{M_{min}}{M_{joint}} > T_2$$

joint demodulation is performed at a block 50. Otherwise, single-user demodulation is performed at a block 42, preferably using the channel parameters estimated by means of joint acquisition.

A second embodiment that uses all three control functions is illustrated in the flowchart in FIG. 6. This embodiment also shows how the present invention can be used with the invention in Bottomley et al., U.S. patent application Ser. No. 08/897,309 filed Jul. 21, 1997, which describes selecting between a 1-tap channel model single user demodulator and a 2-tap channel model single user demodulator. First, single user acquisition is performed using a 1-tap channel model in block 100. Then, the resulting C/(I+N) is compared to a threshold in a decision block 102. If the threshold is exceeded, then the channel is assumed to have only 1 tap and the SINR is sufficient for 1-tap demodulation, so single user demodulation based on a 1-tap channel model is performed in block 104. If the modulation is differential, then either coherent or differential demodulation may be performed.

If the SINR is not sufficient, then single user acquisition with a 2-tap channel model is performed in block 106. The results from the 1-tap and 2-tap acquisitions are used to determine whether the channel for the desired signal is dispersive or not in decision block 108. If the channel is decided to be not dispersive, then the Doppler spread is examined in decision block 110. If the Doppler spread is high, then single user demodulation with a 1-tap channel model is performed in block 104, as the speed would be too high to consider joint demodulation. If the Doppler spread is low, then joint acquisition is performed in block 112. In decision block 114, the (I+N)/N is compared to a threshold to determine if there is a dominant interferer. If so, joint demodulation is performed in block 116. Otherwise, single user demodulation with a 1-tap channel model is performed in block 104.

If the channel is decided to be dispersive, then the SINR based on the two-tap channel model is compared to a threshold at a block 118. If it exceeds the threshold, then there is sufficient SINR for two-tap single user demodulation, which is performed in block 120. Otherwise, the Doppler spread is examined in decision block 122. If the Doppler spread is high, then single user demodulation with a 2-tap channel model is performed in block 120, as the speed would be too high to consider joint demodulation. If the Doppler spread is low, then joint acquisition is performed in block 124, similarly to as it would be performed in block 112, using a 1-tap channel model. In decision block 126, the final metrics from the 1-tap channel model and the joint acquisition are compared to determine which is more important, self ISI or interference from a dominant cochannel interferer. If the residual interference plus noise from joint acquisition is smaller than the interference plus noise after single-user two-tap acquisition, then joint demodulation is performed in block 116. Otherwise, single user demodulation with a 2-tap channel model is performed in block 120.

Other combinations of the control functions, as well as combinations with other control functions, is anticipated. For example, if the channel estimation is accurate enough at high speeds, then the need to examine vehicle speed (Doppler spread) can be eliminated. Also, for the case of a base station receiver, there is a separate Doppler spread for each user. Joint demodulation may be inhibited if the Doppler spread of either the desired user or an interferer is too high. Alternatively, joint demodulation may be performed if the Doppler spread of the interferer is low, even when the Doppler spread of the desired user is high.

While the present invention has been described with respect to joint demodulation of two users, it is also applicable to joint demodulation of three or more users. Specifically, if single user demodulation SINR is not sufficient, joint demodulation of the desired and one interferer may be considered. If the SINR is still not sufficient, joint demodulation of a single user and two interferers may be considered.

It is understood that depending upon the values of expected channel conditions, the environmental conditions in which the invention is used and other differences between various radio systems, the particular channel condition indicator values employed in practice of the invention may differ from system to system and often are advantageously determined empirically. Also, while the invention has been described in terms of making slot-by-slot decisions whether to use conventional or joint demodulation, the invention also contemplates combining and averaging the decisions over several slots or over a prescribed time period in a non-slotted system. Such an averaging technique could be used, for example, in deciding whether the channel is dispersive, which can be used for high-speed mobiles as well as low speed mobiles.

While embodiments of the invention have been described in detail, various modifications and other embodiments thereof may be devised by one skilled in the art without departing from the spirit and the scope of the invention, as defined by the appended claims.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

What is claimed is:

1. A radio receiver for receiving a signal that includes a desired carrier, a co-channel dominant interferer and noise, said radio receiver comprising:

a Doppler spread estimator for generating an estimated Doppler spread value of the carrier;

a first estimator for generating an estimated carrier-to-dominant interferer plus noise ratio value;

a second estimator for generating an estimated dominant interferer plus noise-to-noise ratio value; and a control unit, responsive to said estimated values, for controlling said radio receiver to selectively implement either single-user demodulation of the carrier or joint demodulation of the carrier and dominant interferer.

2. A radio receiver as in claim 1, wherein said control unit compares said estimated values to respective threshold values and controls said radio receiver to implement either single-user demodulation or joint demodulation in accordance with the results of said comparisons.

3. A radio receiver as in claim 1, wherein said control unit determines whether the carrier is dispersive, and is responsive to a determination that the carrier is dispersive to control said radio receiver to implement single-user demodulation.

4. A radio receiver as in claim 1, wherein said control unit determines whether the carrier is dispersive and whether the dominant interferer is greater or less than the dispersiveness of the carrier, and is responsive to the dominant interferer being less than the dispersiveness of the carrier to control said radio receiver to implement single-user demodulation.

5. A radio receiver as in claim 1, wherein said control unit determines whether the received signal includes multiple dominant interferers, and is responsive to a determination that the received signal includes multiple dominant interferers to control said radio receiver to implement single-user demodulation.

6. A mobile terminal used in a wireless communications system for receiving a signal that includes a desired carrier, a co-channel dominant interferer and noise, said mobile terminal comprising:

a Doppler spread estimator for generating an estimated Doppler spread value of the carrier;

a first estimator for generating an estimated carrier-to-dominant interferer plus noise ratio value;

a second estimator for generating an estimated dominant interferer plus noise-to-noise ratio value, and a control unit, responsive to said estimated values, for selectively controlling said mobile terminal to implement either single-user demodulation of the carrier or joint demodulation of the carrier and dominant interferer.

7. A mobile communications system base station for receiving a signal that includes a desired carrier, a co-channel dominant interferer and noise, said base station comprising:

a Doppler spread estimator for generating an estimated Doppler spread value;

a first estimator for generating an estimated carrier-to-dominant interferer plus noise ratio value;

a second estimator for generating an estimated dominant interferer plus noise-to-noise ratio value; and a control unit, responsive to said estimated values, for selectively controlling said base station to implement either single-user demodulation of the carrier or joint demodulation of the carrier and dominant interferer.

8. A radio receiver for receiving a signal that includes a desired carrier, a co-channel dominant interferer and noise, said radio receiver comprising:

a control unit for controlling said radio receiver to selectively implement either single-user demodulation of the carrier or joint demodulation of the carrier and dominant interferer, the control unit determining whether the carrier is dispersive, and being responsive to a determination that the carrier is dispersive to control said radio receiver to implement single-user demodulation, and being responsive to a determination that the carrier is not dispersive, for generating an estimated Doppler spread value of the carrier, and being responsive to an estimated Doppler spread value that is at least equal to a threshold $T_D$ to control said radio receiver to implement single-user demodulation;

the control unit, responsive to the estimated Doppler spread value being less than the threshold $T_D$, for generating an estimated carrier-to-dominant interferer plus noise ratio value SINR, and being responsive to the SINR being at least equal to a threshold $T_1$ to control said radio receiver to implement single-user demodulation; and the control unit, responsive to the SINR being less than the threshold $T_1$, for performing acquisition of the carrier and the dominant interferer and for generating a noise plus total interference value $M_{min}$ by single-user acquisition and a noise plus residual interference value $M_{joint}$ by joint acquisition, and being responsive to the value of the ratio $M_{min}/M_{joint}$ being at least equal to a threshold $T_2$ to control said radio receiver to implement joint demodulation and to the value of the ratio $M_{min}/M_{joint}$ being less than said threshold $T_2$ to control said radio receiver to implement single-user demodulation.

9. A radio receiver as in claim 8, wherein the control unit determines whether the received signal includes a single dominant interferer or multiple dominant interferers, and is responsive to a determination that there are multiple dominant interferers to control said radio receiver to implement single-user demodulation.

10. A radio receiver as in claim 8, wherein SINR=C/(I+N), where C is the signal power of the carrier, I is the signal power of the dominant interferer, and N is the signal power of all other channel noise, including all other co-channel interferers plus thermal noise.

11. A mobile terminal for receiving a signal that includes a desired carrier, a co-channel dominant interferer and noise, said cellular mobile terminal comprising:

a control unit for controlling said cellular mobile terminal to selectively implement either single-user demodulation of the carrier or joint demodulation of the carrier and dominant interferer;

the control unit determining whether the carrier is dispersive, and is responsive to a determination that the carrier is dispersive to control said mobile terminal to implement single-user demodulation;

the control unit, responsive to a determination that the carrier is not dispersive, for generating an estimated Doppler spread value of the carrier, and is responsive to an estimated Doppler spread value that is at least equal to a threshold $T_D$ to control said mobile terminal to implement single-user demodulation;

the control unit, responsive to the estimated Doppler spread value being less than the threshold $T_D$, for generating an estimated carrier-to-dominant interferer plus noise ratio value SINR, and being responsive to the SINR being at least equal to a threshold $T_1$, to control said mobile terminal to implement single-user demodulation; and the control unit, responsive to the SINR being less than the threshold $T_1$, for performing acquisition of the carrier and the interferer and for generating a noise plus total interference value $M_{min}$ by single-user acquisition and a noise plus residual interference value $M_{joint}$ by joint acquisition, and being responsive to the value of the ratio $M_{min}/M_{joint}$ being at least equal to a threshold $T_2$ to control said cellular mobile terminal to implement joint demodulation and to the value of the ratio $M_{min}/M_{joint}$ being less than said threshold $T_2$ to control said mobile terminal to implement single-user demodulation.

12. A cellular mobile terminal as in claim 11, wherein the control unit determines whether the received signal includes a single dominant interferer or multiple dominant interferers, and is responsive to a determination that there are multiple dominant interferers to control said mobile terminal to implement single-user demodulation.

13. A mobile communications system base station for receiving a signal that includes a desired carrier, a co-channel dominant interferer and noise, said cellular system base station comprising:

a control unit for controlling said base station to selectively implement either single-user demodulation of the carrier or joint demodulation of the carrier and dominant interferer;

the control unit for determining whether the carrier is dispersive, and being responsive to a determination that the carrier is dispersive to control said base station to implement single-user demodulation;

the control unit, responsive to a determination that the carrier is not dispersive, for generating an estimated Doppler spread value, and being responsive to an estimated Doppler spread value that is at least equal to a threshold $T_D$ to control said base station to implement single-user demodulation;

the control unit, responsive to the estimated Doppler spread value being less than the threshold $T_D$, for generating an estimated carrier-to-dominant interferer plus noise ratio value SINR, and being responsive to the SINR being at least equal to a threshold $T_1$ to control said base station to implement single-user demodulation; and the control unit, responsive to the SINR being less than the threshold $T_1$, for performing acquisition of the carrier and the interferer and for generating a noise plus total interference value $M_{min}$, by single-user acquisition and a noise plus residual interference value $M_{joint}$ by joint acquisition, and being responsive to the value of the ratio $M_{min}/M_{joint}$ being at least equal to a threshold T2 to control said base station to implement joint demodulation and to the value of the ratio $M_{min}/M_{joint}$ being less than said threshold $T_2$ to control said cellular system base station to implement single-user demodulation.

14. A mobile communications system base station as in claim 13, wherein the control unit determines whether the received signal includes a single dominant interferer or multiple dominant interferers, and is responsive to a determination that there are multiple dominant interferers to control said cellular system base station to implement single-user demodulation.

15. A radio receiver for receiving a signal that includes a desired carrier, at least one co-channel dominant interferer and noise, said radio receiver comprising:

a Doppler spread estimator for generating an estimated Doppler spread value $F_{D,av}$ of the carrier;

a first estimator for generating an estimated carrier-to-dominant interferer plus noise ratio value C/(I+N);

a second estimator for generating an estimated dominant interferer plus noise-to-noise ratio value (I+N)/N; and a control unit for comparing said estimated values to respective threshold values and for controlling said radio receiver, in accordance with the results of said comparisons, to implement either single-user demodulation of the carrier or joint demodulation of the carrier and dominant interferer.

16. A radio receiver as in claim 15, wherein said control unit determines whether said at least one dominant interferer is a single dominant interferer or multiple dominant interferers, and is responsive to a determination that the at least one dominant interferer is multiple dominant interferers to control said radio receiver to implement single-user demodulation.

17. A radio receiver as in claim 15, wherein the control unit determines whether the carrier is dispersive, and is responsive to a determination that the carrier is dispersive to control said radio receiver to implement single-user demodulation.

18. A method of operating a radio receiver that receives a signal that includes a desired carrier, a co-channel dominant interferer and noise, comprising:

generating an estimated Doppler spread value of the carrier;

developing an estimated carrier-to-dominant interferer plus noise ratio value;

providing an estimated dominant interferer plus noise-to-noise ratio value; and controlling the radio receiver, in accordance with the estimated values, to selectively implement either single-user demodulation of the carrier or joint demodulation of the carrier and dominant interferer.

19. A method as in claim 18, further comprising comparing the estimated values to respective threshold values, and controlling the radio receiver, in accordance with the results of the comparisons, to implement either single-user demodulation or joint demodulation.

20. A method as in claim 18, further comprising determining whether the carrier is dispersive, and controlling the radio receiver to implement single-user demodulation in response to a determination that the carrier is dispersive.

21. A method as in claim 18, further comprising determining whether the carrier is dispersive and whether the dominant interferer is greater or less than the dispersiveness of the carrier, and, in response to a determination that the dominant interferer is less than the dispersiveness of the carrier, controlling the radio receiver to implement single-user demodulation.

22. A method as in claim 18, further comprising determining whether the received signal includes a single dominant interferer or multiple dominant interferers, and, in response to a determination that the received signal includes multiple dominant interferers, controlling the radio receiver to implement single-user demodulation.

23. A method of operating a mobile terminal that receives a signal that includes a desired carrier, a co-channel dominant interferer and noise, comprising:

generating an estimated Doppler spread value of the carrier;

developing an estimated carrier-to-dominant interferer plus noise ratio value;

providing an estimated dominant interferer plus noise-to-noise ratio value; and controlling the mobile terminal, in accordance with the values of the estimated values, to selectively implement either single-user demodulation of the carrier or joint demodulation of the carrier and dominant interferer.

24. A method of operating a mobile communications system base station that receives a signal that includes a desired carrier, a co-channel dominant interferer and noise, comprising:

generating an estimated Doppler spread value of the carrier;

developing an estimated carrier-to-dominant interferer plus noise ratio value;

providing an estimated dominant interferer plus noise-to-noise ratio value; and controlling the base station, in accordance with the values of the estimated values, to selectively implement either single-user demodulation of the carrier or joint demodulation of the carrier and dominant interferer.

25. A method of operating a radio receiver that receives a signal that includes a desired carrier, a co-channel dominant interferer and noise, comprising:

controlling the radio receiver to selectively implement either single-user demodulation of the carrier or joint demodulation of the carrier and dominant interferer;

determining whether the carrier is dispersive, and, in response to a determination that the carrier is dispersive, controlling the radio receiver to implement single-user demodulation;

generating, in response to a determination that the carrier is not dispersive, an estimated Doppler spread value of the carrier, and, in response to an estimated Doppler spread value that is at least equal to a threshold $T_D$, controlling the radio receiver to implement single-user demodulation;

developing, in response to the estimated Doppler spread value being less than the threshold $T_D$, an estimated carrier-to-dominant interferer plus noise ratio value SINR, and, in response to the SINR being at least equal to a threshold $T_1$, controlling the radio receiver to implement single-user demodulation;

performing, in response to the SINR being less than the threshold $T_1$, acquisition of the carrier and the dominant interferer; and providing a noise plus total interference value $M_{min}$ by single-user acquisition and a noise plus residual interference value $M_{joint}$ by joint acquisition, and, in response to the value of the ratio $M_{min}/M_{joint}$ being at least equal to a threshold $T_2$, controlling the radio receiver to implement joint demodulation, and, in response to the value of the ratio $M_{min}/M_{joint}$ being less than the threshold $T_2$, controlling the radio receiver to implement single-user demodulation.

26. A method as in claim 25, further comprising determining whether the received signal includes a single dominant interferer or multiple dominant interferers, and, in response to a determination that there are multiple dominant interferers, controlling the radio receiver to implement single-user demodulation.

27. A method as in claim 25, wherein SINR=C/(I+N), where C is the signal power of the carrier, I is the signal power of the dominant interferer, and N is the signal power of all other channel noise, including all other co-channel interferers plus thermal noise.

28. A method of operating a mobile terminal that receives a signal that includes a desired carrier, a co-channel dominant interferer and noise, comprising:

controlling the mobile terminal to selectively implement either single-user demodulation of the carrier or joint demodulation of the carrier and dominant interferer;

determining whether the carrier is dispersive, and, in response to a determination that the carrier is dispersive, controlling the mobile terminal to implement single-user demodulation;

generating, in response to a determination that the carrier is not dispersive, an estimated Doppler spread value of the carrier, and, in response to an estimated Doppler spread value that is at least equal to a threshold $T_D$, controlling the mobile terminal to implement single-user demodulation;

developing, in response to the estimated Doppler spread value being less than the threshold $T_D$, an estimated carrier-to-dominant interferer plus noise ratio value SINR, and, in response to the SINR being at least equal to a threshold $T_1$, controlling the mobile terminal to implement single-user demodulation;

performing, in response to the SINR being less than the threshold $T_1$, acquisition of the carrier and the dominant interferer; and providing a noise plus total interference value $M_{min}$ by single-user acquisition and a noise plus residual interference value $M_{joint}$ by joint acquisition, and, in response to the value of the ratio $M_{min}/M_{joint}$ being at least equal to a threshold $T_2$, controlling the mobile terminal to implement joint demodulation, and, in response to the value of the ratio $M_{min}/M_{joint}$ being less than the threshold $T_2$, controlling the mobile terminal to implement single-user demodulation.

29. A method as in claim 28, further comprising determining whether the received signal includes a single dominant interferer or multiple dominant interferers, and, in response to a determination that there are multiple dominant interferers, controlling the mobile terminal to implement single-user demodulation.

30. A method of operating a mobile communications system base station that receives a signal that includes a desired carrier, a co-channel dominant interferer and noise, comprising:

controlling the base station to selectively implement either single-user demodulation of the carrier or joint demodulation of the carrier and dominant interferer;

determining whether the carrier is dispersive, and, in response to a determination that the carrier is dispersive, controlling the base station to implement single-user demodulation;

generating, in response to a determination that the carrier is not dispersive, an estimated Doppler spread value, and, in response to an estimated Doppler spread value that is at least equal to a threshold $T_D$, controlling the base station to implement single-user demodulation;

developing, in response to the estimated Doppler spread value being less than the threshold $T_D$, an estimated carrier-to-dominant interferer plus noise ratio value SINR, and, in response to the SINR being at least equal to a threshold $T_1$, controlling the base station to implement single-user demodulation;

performing, in response to the SINR being less than the threshold $T_1$, acquisition of the carrier and the dominant interferer; and providing a noise plus total interference value $M_{min}$ by single-user acquisition and a noise plus residual interference value $M_{joint}$ by joint acquisition, and, in response to the value of the ratio $M_{min}/M_{joint}$ being at least equal to a threshold $T_2$, controlling the base station to implement joint demodulation, and, in response to the value of the ratio $M_{min}/M_{joint}$ being less than the threshold $T_2$, controlling the base station to implement single-user demodulation.

31. A method as in claim 30, further comprising determining whether the received signal includes a single dominant interferer or multiple dominant interferers, and, in response to a determination that there are multiple dominant interferers, controlling the base station to implement single-user demodulation.

32. A method of operating a radio receiver that receives a signal that includes a desired carrier, at least one co-channel dominant interferer and noise, comprising: generating an estimated Doppler spread value $F_{D,av}$ of the carrier, developing an estimated carrier-to-dominant interferer plus noise ratio value C/(I+N);

producing an estimated dominant interferer plus noise-to-noise ratio value (I+N)/N;

comparing the estimated values to respective threshold values; and controlling the radio receiver, in response to and in accordance with the results of said comparing step, to implement either single-user demodulation of the carrier or joint demodulation of the carrier and dominant interferer.

33. A method as in claim 32, further comprising determining whether the at least one dominant interferer is a single dominant interferer or multiple dominant interferers, and, in response to a determination that the at least one dominant interferer is multiple dominant interferers, controlling the radio receiver to implement single-user demodulation.

34. A method as in claim 32, further comprising determining whether the carrier is dispersive, and, in response to a determination that the carrier is dispersive, controlling the radio receiver to implement single-user demodulation.

* * * * *